(12) United States Patent
Ito

(10) Patent No.: US 7,041,958 B2
(45) Date of Patent: May 9, 2006

(54) LENS SYSTEM AND IMAGE-TAKING APPARATUS HAVING THE SAME

(75) Inventor: Daisuke Ito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 10/771,789

(22) Filed: Feb. 3, 2004

(65) Prior Publication Data

US 2004/0155176 A1    Aug. 12, 2004

(30) Foreign Application Priority Data

Feb. 5, 2003    (JP) .............................. 2003-028597

(51) Int. Cl.
    *H01J 3/14*    (2006.01)
(52) U.S. Cl. ...................... 250/216; 359/691
(58) Field of Classification Search ................ 359/781, 359/793, 680, 686, 691; 250/216
See application file for complete search history.

(56) References Cited

U.S. PATENT DOCUMENTS

| | | | |
|---|---|---|---|
| 5,233,474 A * | 8/1993 | Hirakawa ................... 359/717 |
| 5,251,073 A | 10/1993 | Schauss | |
| 5,619,380 A * | 4/1997 | Ogasawara et al. ......... 359/661 |
| 5,724,190 A | 3/1998 | Tachihara et al. | |
| 5,781,350 A | 7/1998 | Tachihara et al. | |
| 5,796,528 A | 8/1998 | Mihara | |
| 5,812,327 A * | 9/1998 | Doh ........................... 359/793 |
| 6,018,425 A * | 1/2000 | Nakabayashi et al. ...... 359/753 |
| 6,118,592 A | 9/2000 | Kohno et al. | |
| 6,236,521 B1 * | 5/2001 | Nanba ......................... 359/715 |
| 6,243,217 B1 * | 6/2001 | Nagaoka ..................... 359/793 |

FOREIGN PATENT DOCUMENTS

| | | |
|---|---|---|
| JP | 60-037514 | 2/1985 |
| JP | 5-37288 | 6/1993 |
| JP | 05-288985 | 11/1993 |
| JP | 08-005908 | 1/1996 |
| JP | 09-033802 | 2/1997 |
| JP | 09-090218 | 4/1997 |
| JP | 09-179022 | 7/1997 |
| JP | 10-048514 | 2/1998 |
| JP | 10-48515 | 2/1998 |
| JP | 10-142496 | 5/1998 |
| JP | 10-300906 | 11/1998 |
| JP | 10-301025 | 11/1998 |

(Continued)

OTHER PUBLICATIONS

Meyer-Arendt, Jurgen R., Introduction to Classical and Modern Optics, Prentice Hall, 4th Ed., pp. 29-31, 34, 46, 51-54, and 57-59.*

*Primary Examiner*—Thanh X. Luu
*Assistant Examiner*—Kevin Wyatt
(74) *Attorney, Agent, or Firm*—Morgan & Finnegan, LLP

(57) ABSTRACT

A lens system disclosed in the present application comprises: in order from the front to the rear, a first lens element having a meniscus shape whose concave surface is directed rearward and having a negative optical power; an aperture stop; a second lens element whose both lens surfaces have a convex shape; a third lens element whose both lens surfaces have a concave, and a fourth lens element whose rear surface has a convex shape and having a positive optical power. Thus, a lens system which maintains telecentricity and high optical performance despite a simple and small-sized structure is disclosed.

15 Claims, 17 Drawing Sheets

FOREIGN PATENT DOCUMENTS

| | | |
|---|---|---|
| JP | 11-038316 | 2/1999 |
| JP | 11-109233 | 4/1999 |
| JP | 11-119093 | 4/1999 |
| JP | 2000-2835 | 1/2000 |
| JP | 2001-100094 | 4/2001 |
| JP | 2002-98887 | 4/2002 |

* cited by examiner (A)
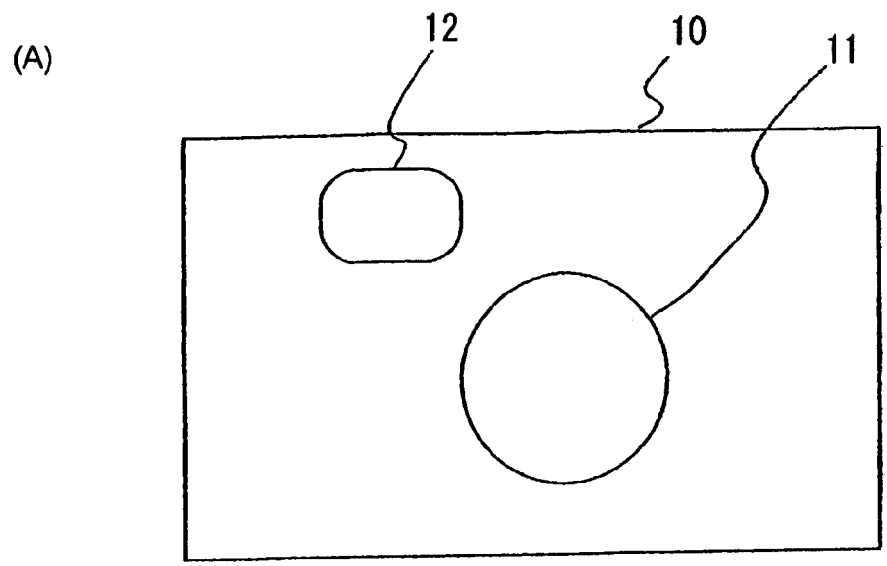
(B)
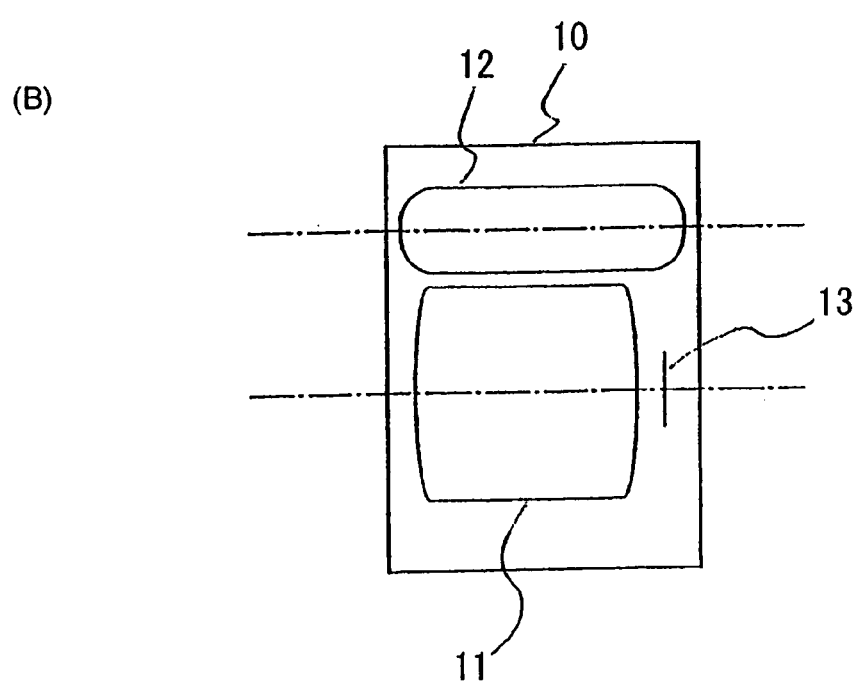
FIG. 17

LENS SYSTEM AND IMAGE-TAKING APPARATUS HAVING THE SAME

BACKGROUND OF THE INVENTION

1. Field of the Invention

The present invention relates to a lens system and, for example, a lens system preferably used as an image-taking optical system of an image-taking apparatus such as a digital video camera, a digital still camera and the like.

2. Description of the Related Art

In recent years, in addition to cameras using silver salt films, for example, 35 mm-size cameras, digital video cameras and digital still cameras using solid-state image pickup elements such as CCD sensors and CMOS sensors have been rapidly popularized as new categories of image-taking apparatuses.

In such digital still cameras and digital video cameras, there has been a strong demand for higher fineness in taken images and downsizing of the image-taking apparatus bodies, and accordingly, combining a high resolution power and downsizing has been required in the image-taking systems (image-taking lenses). In particular, for low-profile cameras which attach importance to portability, image-taking lenses with a short entire lens length have been strongly requested. For a shorter whole lens length, it is advantageous to reduce the number of component lenses as small as possible.

In addition, in terms of a camera using a solid-state image pickup element, if the distance from the exit pupil of the image-taking lens to the image plane is extremely short, shading occurs since an incident angle of an off-axis light ray into the light receiving plane is great. Accordingly, for such an image-taking lens to form an image on a solid-state image pickup element, a telecentric optical system where the exit pupil is sufficiently distant from the image plane is requested.

As an embodiment to realize a telecentric optical system, a so-called retro focus type is known wherein a lens unit on an object side beyond an aperture stop has a negative refractive power and a lens unit on an image side beyond the aperture stop has a positive refractive power. In a retro focus-type image-taking lens, a front lens component and a rear lens component which are positioned across an aperture stop both act so as to make an angle formed by the off-axis principal ray and optical axis small, this is preferable to maintain telecentricity.

As a retro focus-type image-taking lens, for example, a retro focus-type image-taking lens with a 3 units and 4 elements structure of a negative lens, a stop, a cemented lens, and a positive lens is known (patent document 1, for example).

In addition, a retro focus-type image-taking lens with a 3 units and 4 elements structure of a negative lens, a stop, a positive lens, and a cemented lens is known (patent documents 2–14, for example).

In addition, a retro focus-type image-taking lens with a 4 units and 4 elements structure of a negative lens, a stop, a positive lens, a negative lens, and a positive lens is known (patent document 15, for example).

In addition, a retro focus-type image-taking lens with a 4 units and 5 elements structure of a negative lens, a stop, a positive lens, a cemented lens having a positive refractive power, and a negative lens is known (patent document 16, for example).

In addition, a retro focus-type image-taking lens with a 4 units and 5 elements structure of a negative lens, a stop, a positive lens, a cemented lens having a positive refractive power, and a positive lens is known (patent document 17, for example).

In addition, a retro focus-type image-taking lens with a 5 units and 5 elements structure of a negative lens, a stop, a positive lens, a negative lens, a positive lens, and a positive lens is known (patent documents 18 and 19, for example).

In addition, a retro focus-type image-taking lens with a 4 units and 4 elements structure of a negative lens, a positive lens, a stop, a negative lens, and a positive lens is known (patent document 20, for example).

[patent document 1] U.S. Pat. No. 5,251,073
[patent document 2] U.S. Pat. No. 5,724,190
[patent document 3] Japanese Patent Application Laid-Open No. H10(1998)-048515 (Corresponding U.S. Pat. No. 5,796,528)
[patent document 4] Japanese Patent Application Laid-Open No. H09(1997)-179022
[patent document 5] Japanese Patent Application Laid-Open No. H09(1997)-033802
[patent document 6] Japanese Patent Application Laid-Open No. H08(1996)-005908
[patent document 7] Japanese Patent Application Laid-Open No. H11(1999)-119093
[patent document 8] Japanese Patent Application Laid-Open No. H10(1998)-142496
[patent document 9] Japanese Patent Application Laid-Open No. H05(1993)-288985
[patent document 10] Japanese Patent Application Laid-Open No. H09(1997)-090218
[patent document 11] Japanese Patent Application Laid-Open No. H10(1998)-300906
[patent document 12] Japanese Patent Application Laid-Open No. H10(1998)-301025
[patent document 13] Japanese Patent Application Laid-Open No. H11(1999)-038316
[patent document 14] Japanese Patent Application Laid-Open No. H11(1999)-109233 (corresponding to U.S. Pat. No. 6,118,592)
[patent document 15] Japanese Patent Application Laid-Open No. H10(1998)-048514
[patent document 16] U.S. Pat. No. 5,781,350
[patent document 17] Japanese Patent Application Laid-Open No. 2000-002835
[patent document 18] Japanese Patent Application Laid-Open No. 2001-100094
[patent document 19] Japanese Patent Application Laid-Open No. 2002-098887
[patent document 20] Japanese Patent Publication No. H05 (1993)-037288

In a retro focus-type image-taking lens, in order to provide a compact lens structure with narrowed lens intervals, it is preferable to strengthen a negative refractive power of the front lens component and to compose the rearmost lens unit (a lens closest to the image side) of a positive lens. At this time, it is necessary, in order to maintain telecentricity, to strengthen refractive power of the rearmost lens. However, if the refractive power of the rearmost lens of the rear lens component becomes excessively strong, barrel-shaped distortion and astigmatism greatly occur. For avoidance thereof, the front lens component and rear lens component must be arranged apart to some extent, and consequently, it is very difficult to realize a lens system to satisfy requests such as downsizing, telecentricity, and good optical performance.

In order to maintain telecentricity while realizing a compact lens structure, it is necessary that an angle formed by an off-axis principal ray and an on-axis principal ray which are directed from the rearmost lens toward the maximum image height is in a certain range. When these are taken into consideration, none of the image-taking lenses as disclosed in the above-described patent documents 1–20 were sufficient for a lens system to form an image in a solid-state image pickup element.

SUMMARY OF THE INVENTION

An object of the present invention is to provide a lens system which maintains telecentricity and high optical performance despite a simple and small-sized structure.

A lens system from an aspect of the present invention comprises, in order from the front (object side) to the rear (image side), a first lens unit having a negative optical power (an optical power is a reciprocal of a focal length), an aperture stop, and a second lens unit having a positive optical power. And, the first lens unit consists of a lens element whose rear surface has a concave shape, and the second lens unit comprises three lens elements.

In addition, a lens system from another aspect comprises, in order from the front to the rear, a first lens element having a meniscus shape whose concave surface is directed rearward and having a negative optical power, an aperture stop, a second lens element whose both lens surfaces have a convex shape, a third lens element whose both lens surfaces have a concave shape, and a fourth lens element whose rear surface has a convex shape and having a positive optical power, and lens elements included in the lens system are only these first to fourth lens elements.

BRIEF DESCRIPTION OF THE DRAWINGS

FIG. 17(A) is a front view of a digital still camera, and FIG. 17(B) is a side sectional view.

DETAILED DESCRIPTION OF THE PREFERRED EMBODIMENTS

Hereinafter, Embodiments 1–8 (hereinafter, generically referred to as "the present embodiments" unless otherwise provided) of the present invention will be described in detail by use of the drawings. The lens systems of the present embodiments are image-taking lenses to be used to form an image in a solid-state image pickup element.

Figure 1:
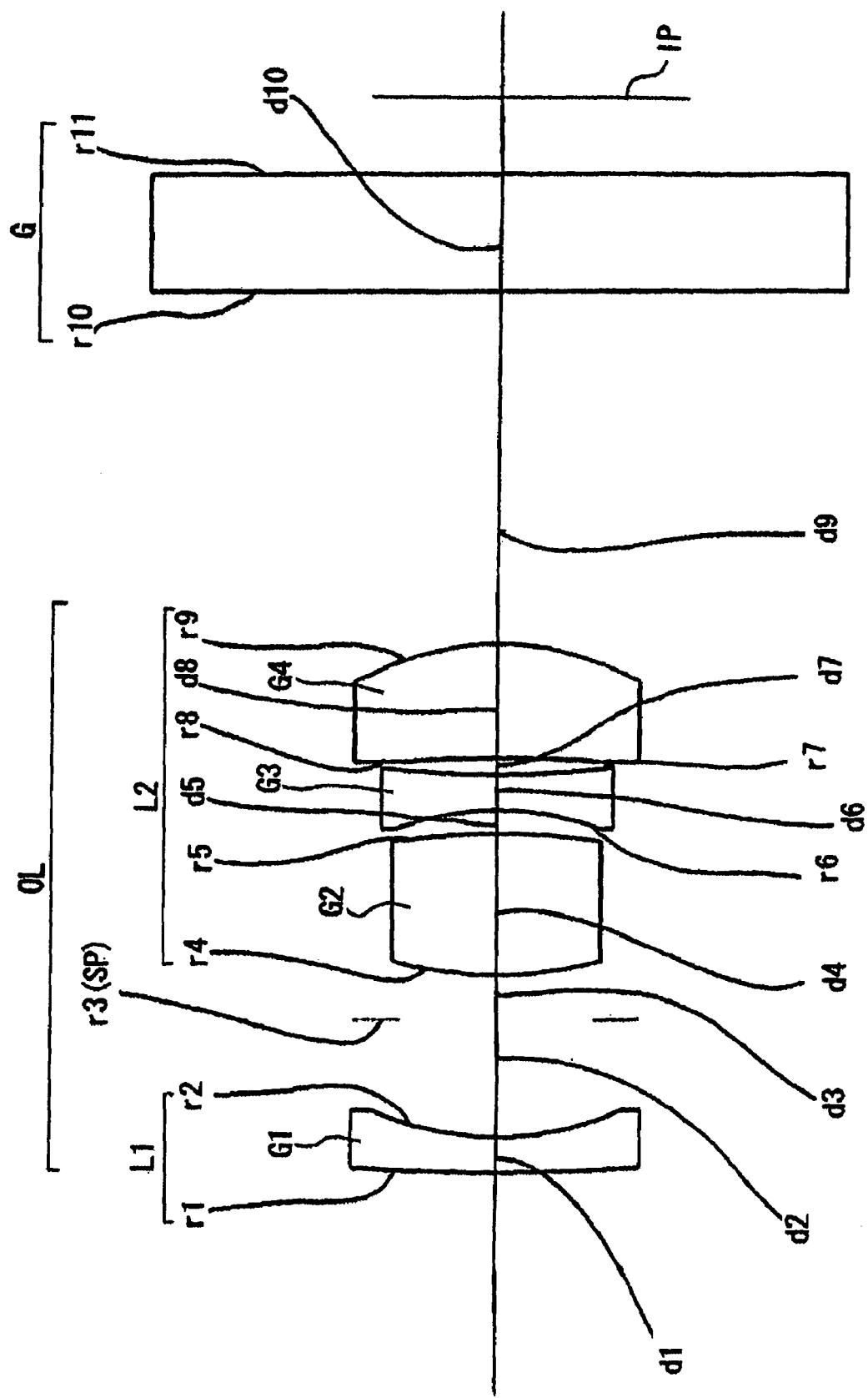
FIG. 1 is a lens section view of a lens system of Embodiment 1.
Figure 2:
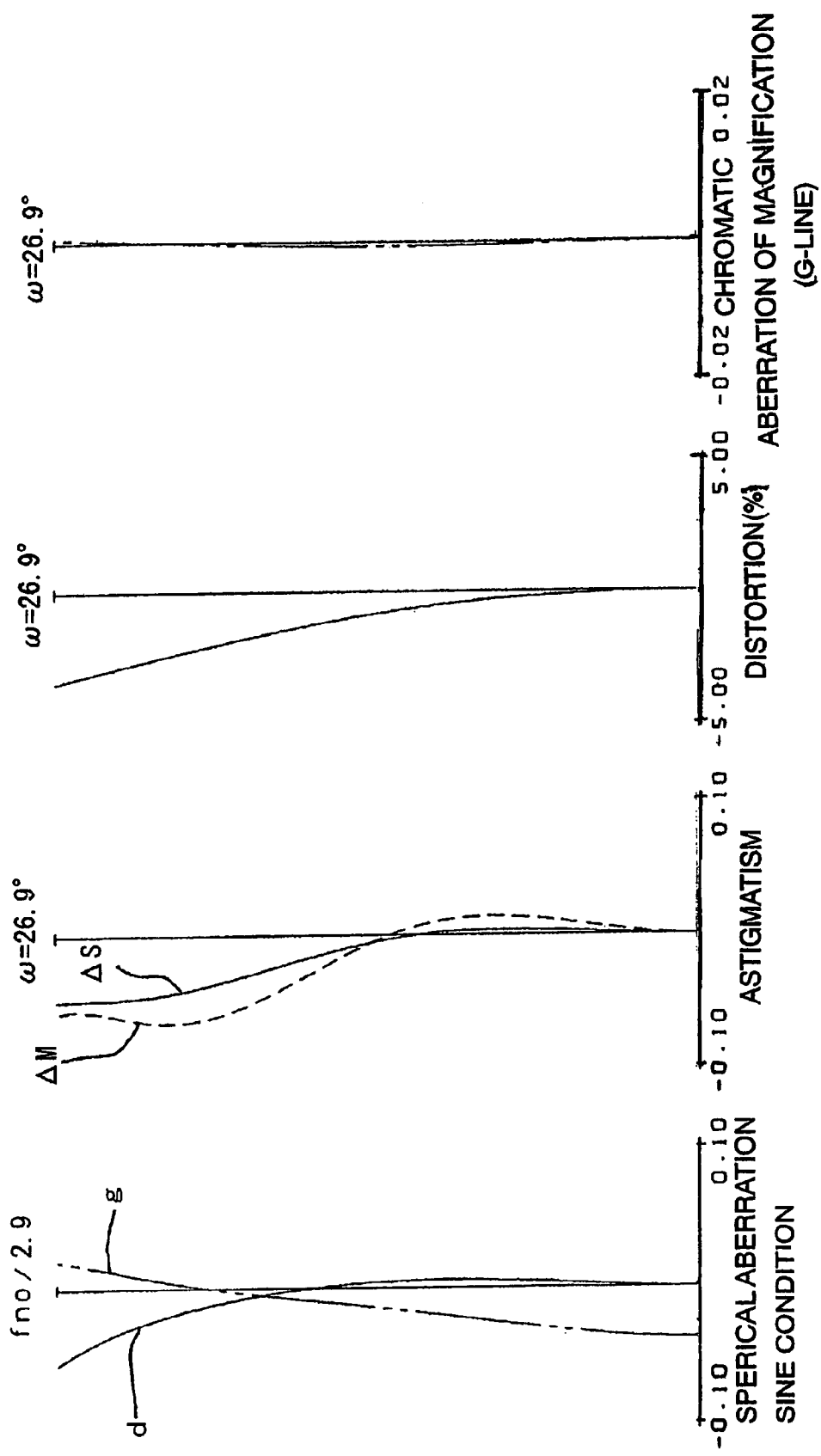
FIG. 2 is an aberration diagram of a lens system of Embodiment 1.
Figure 3:
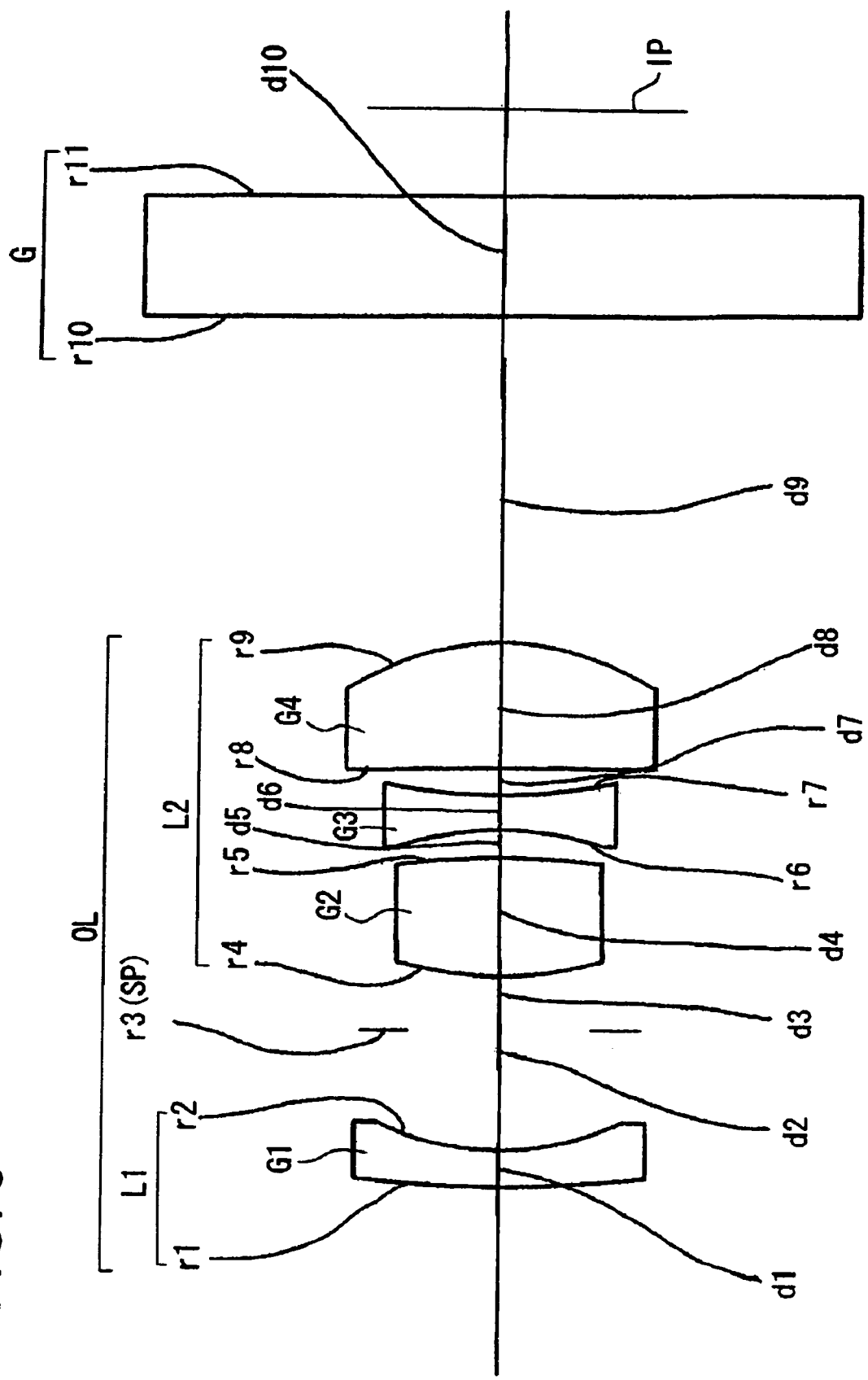
FIG. 3 is a lens section view of a lens system of Embodiment 2.
Figure 4:
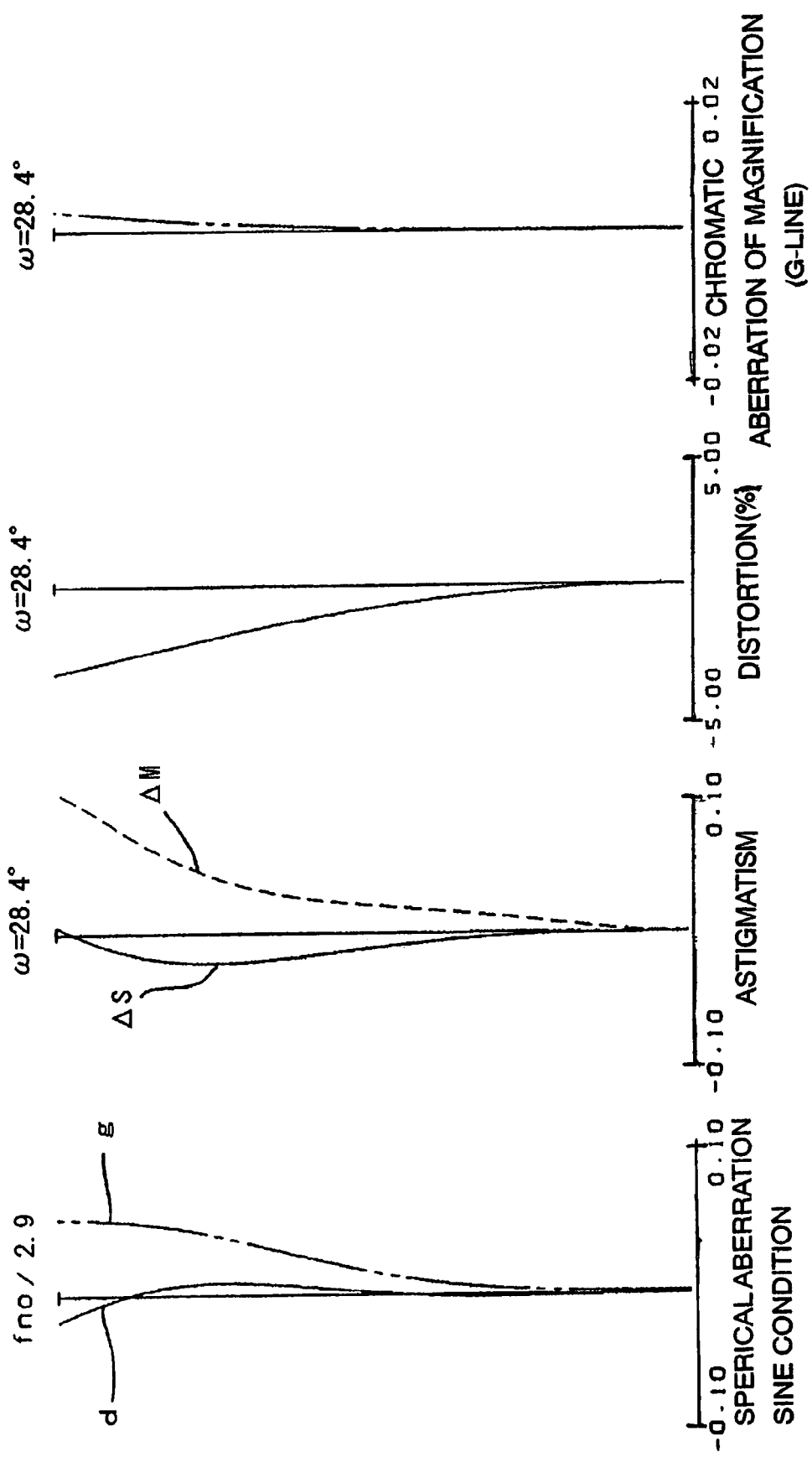
FIG. 4 is an aberration diagram of a lens system of Embodiment 2.
Figure 5:
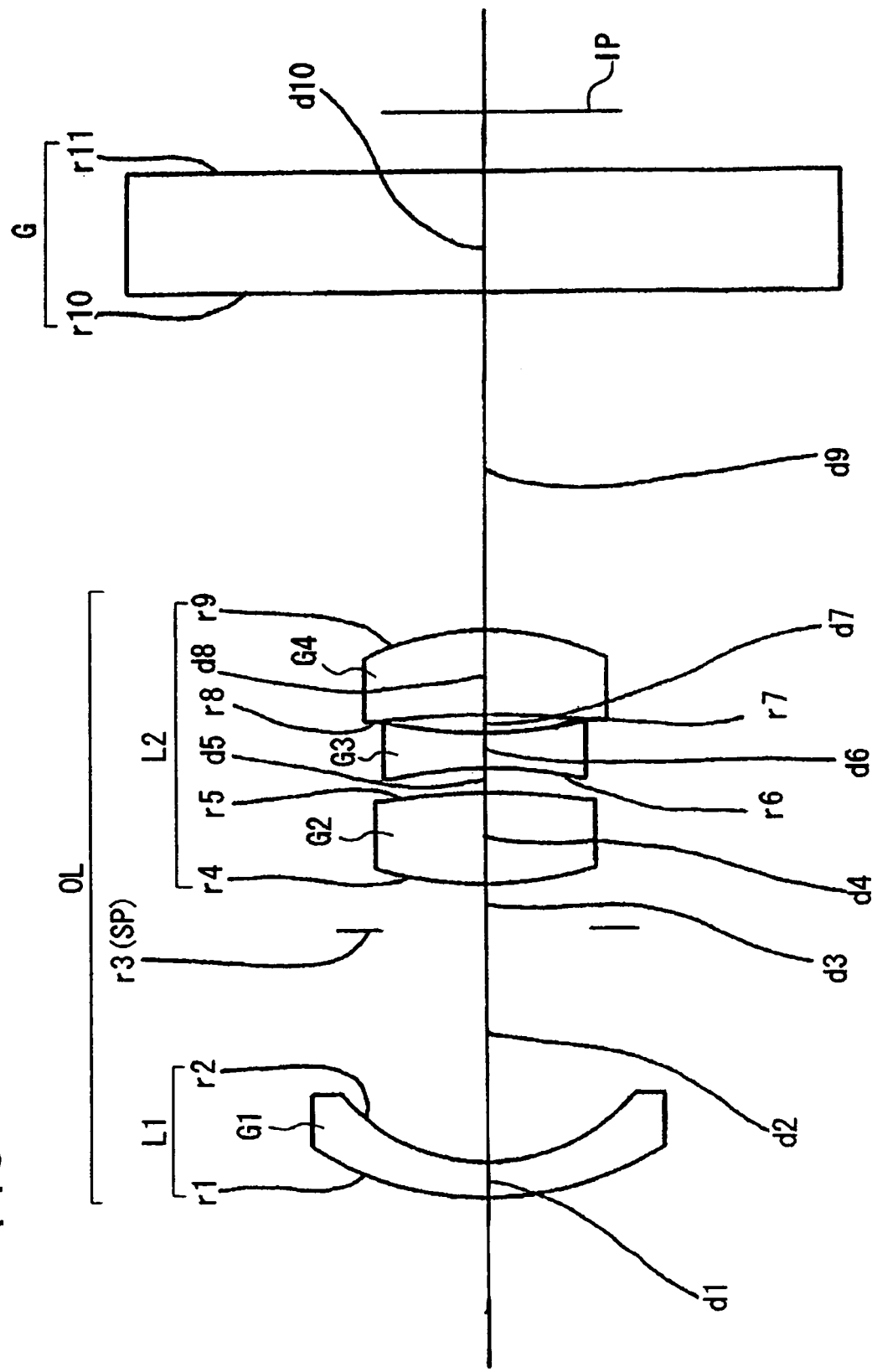
FIG. 5 is a lens section view of a lens system of Embodiment 3.
Figure 6:
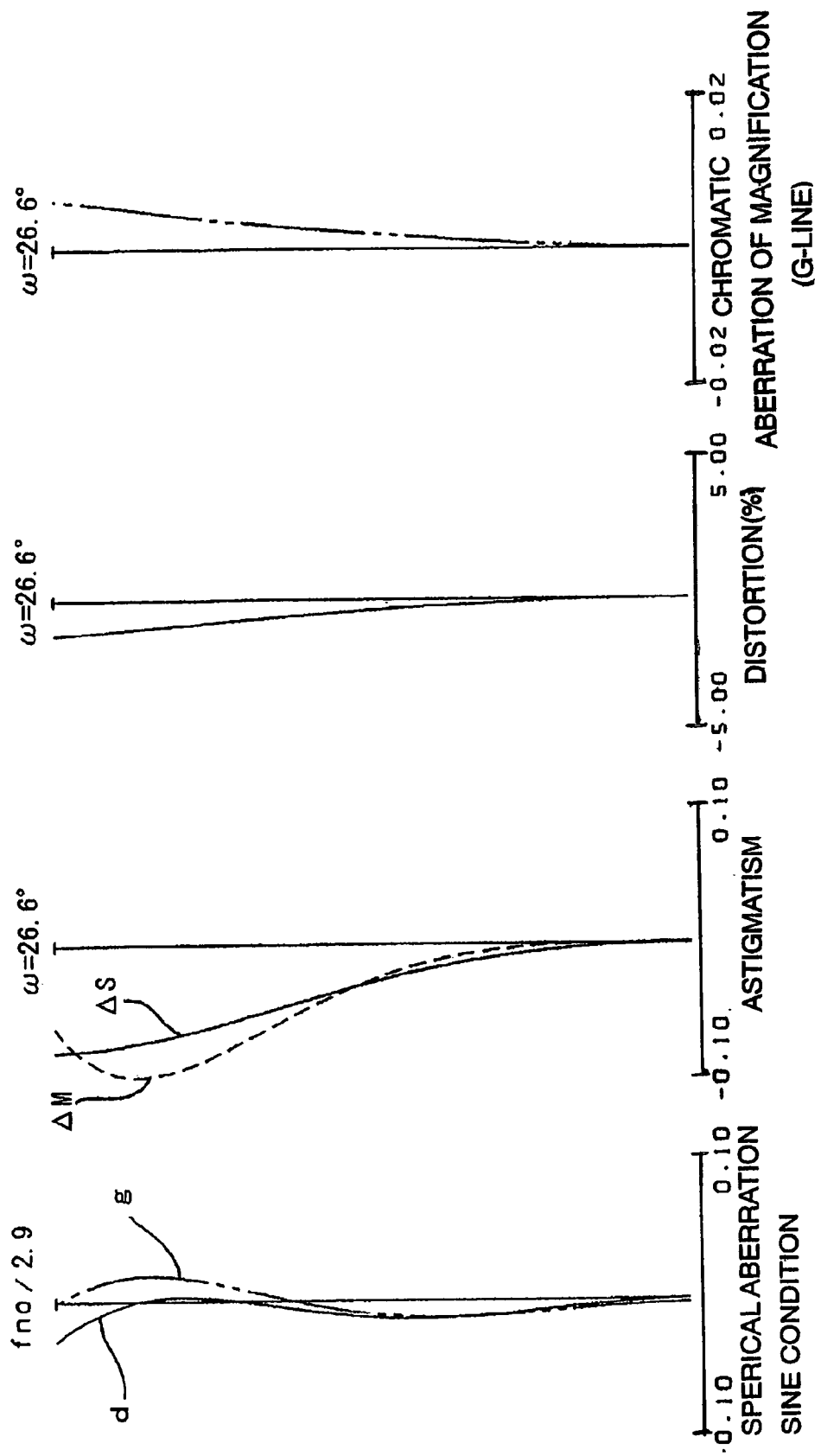
FIG. 6 is an aberration diagram of a lens system of Embodiment 3.
Figure 7:
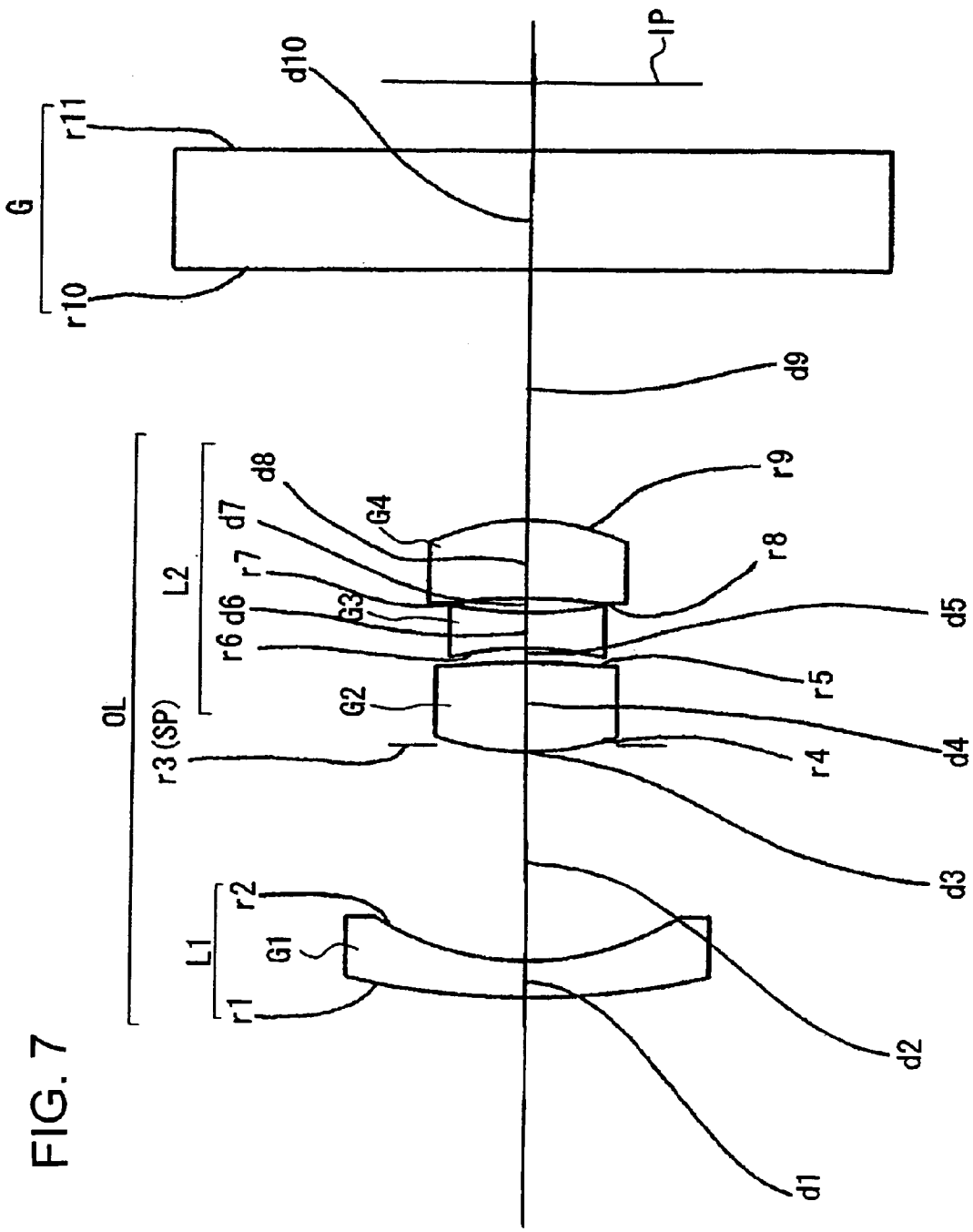
FIG. 7 is a lens section view of a lens system of Embodiment 4.
Figure 8:
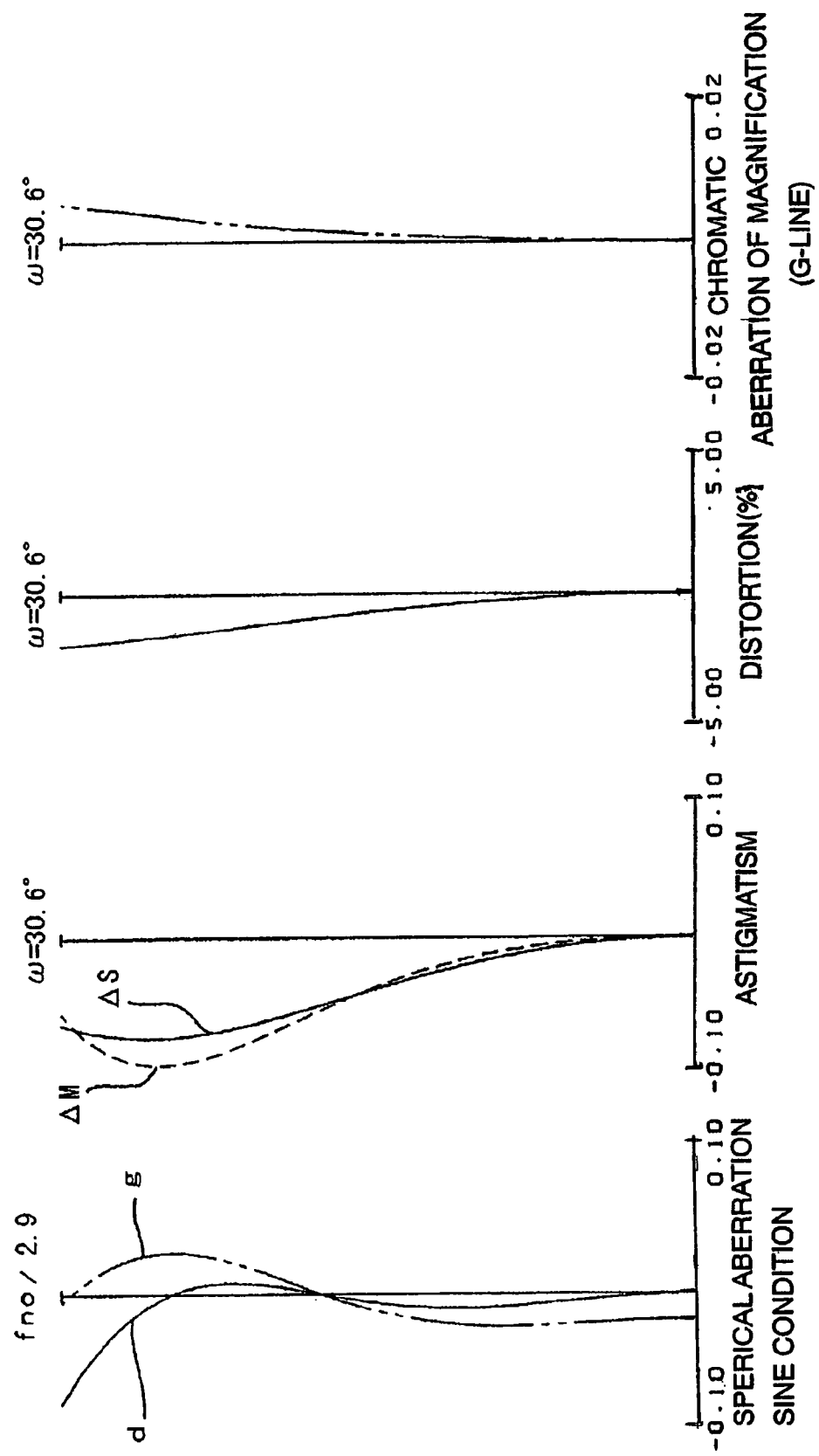
FIG. 8 is an aberration diagram of a lens system of Embodiment 4.
Figure 9:
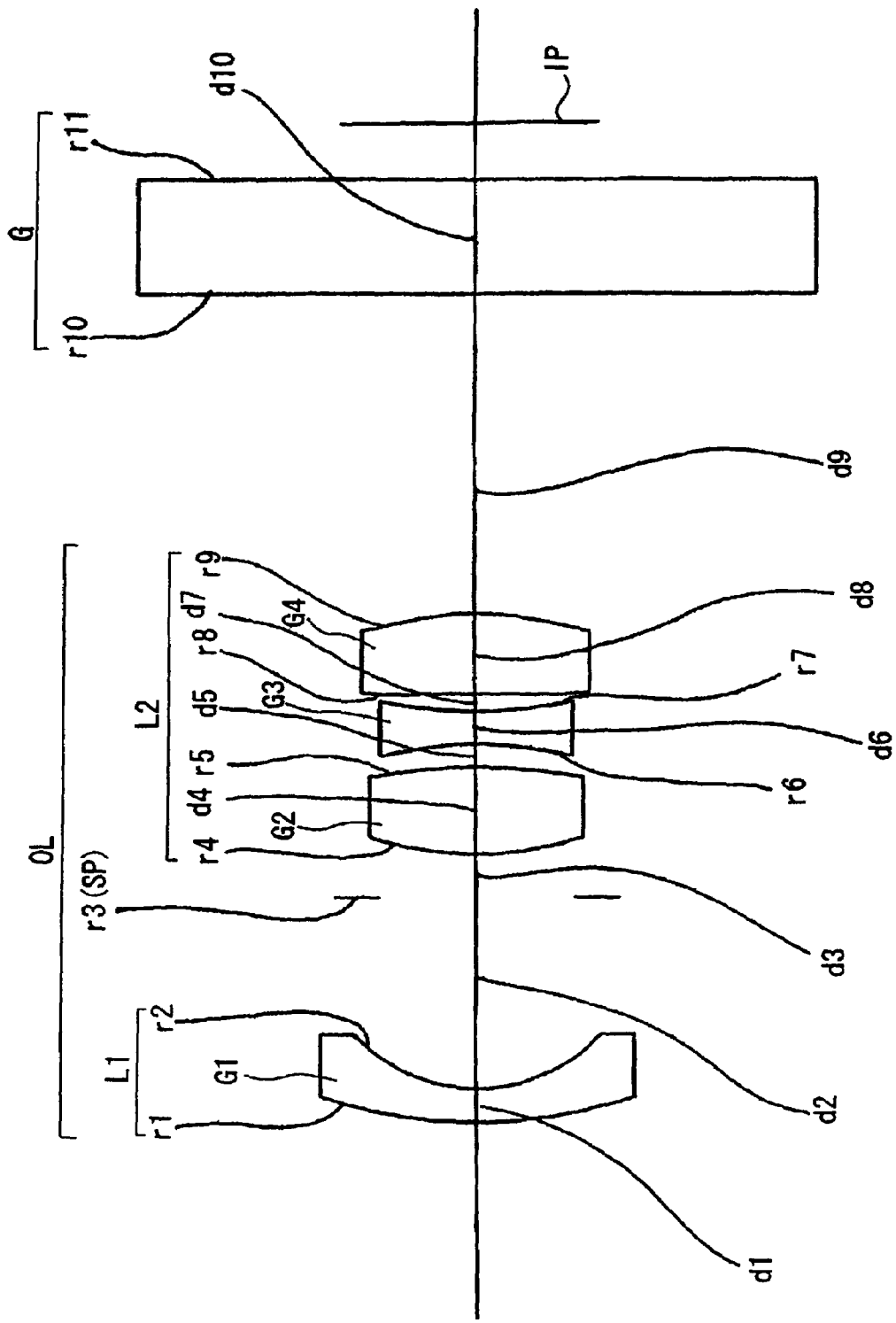
FIG. 9 is a lens section view of a lens system of Embodiment 5.
Figure 10:
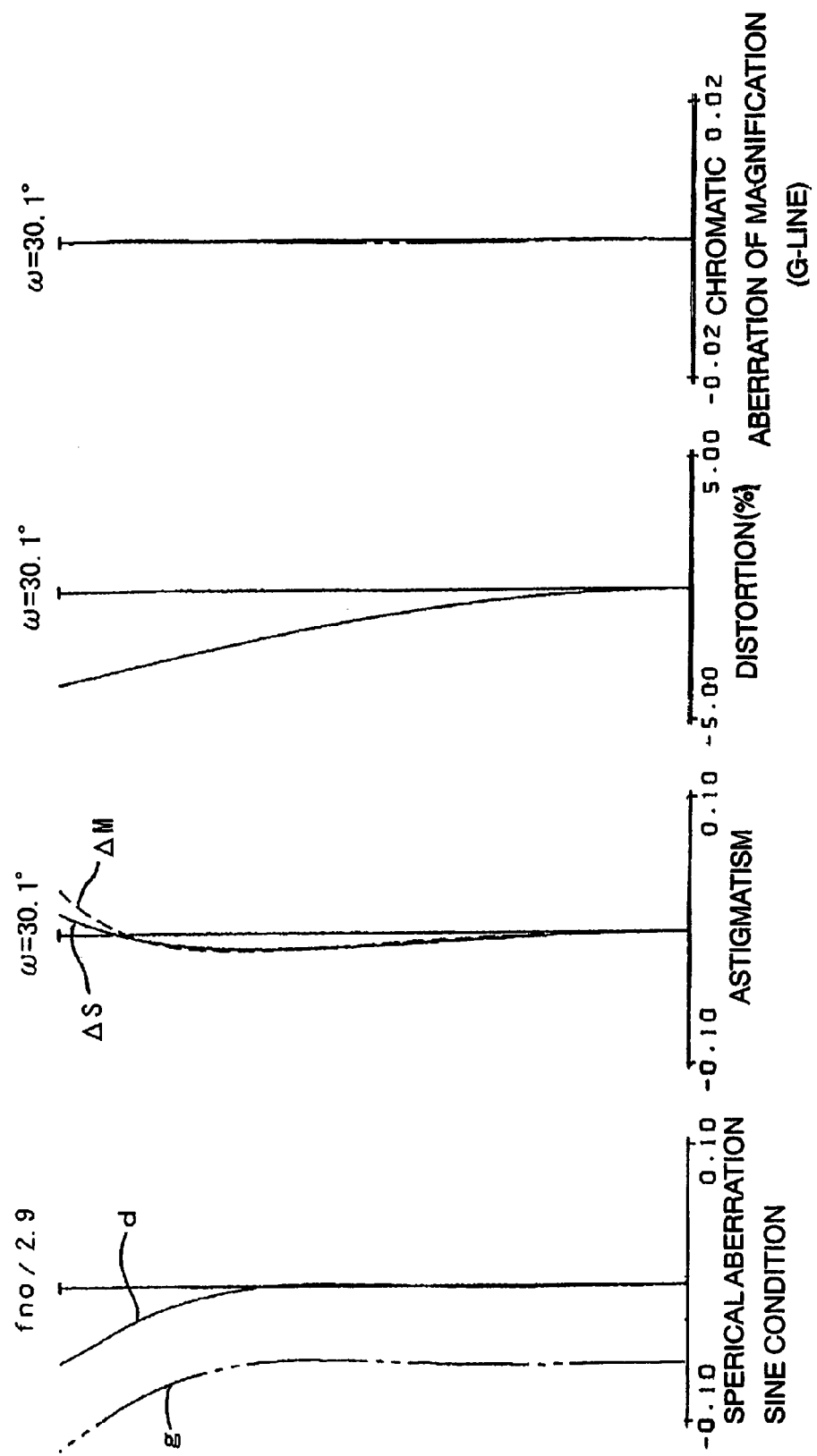
FIG. 10 is an aberration diagram of a lens system of Embodiment 5.
Figure 11:
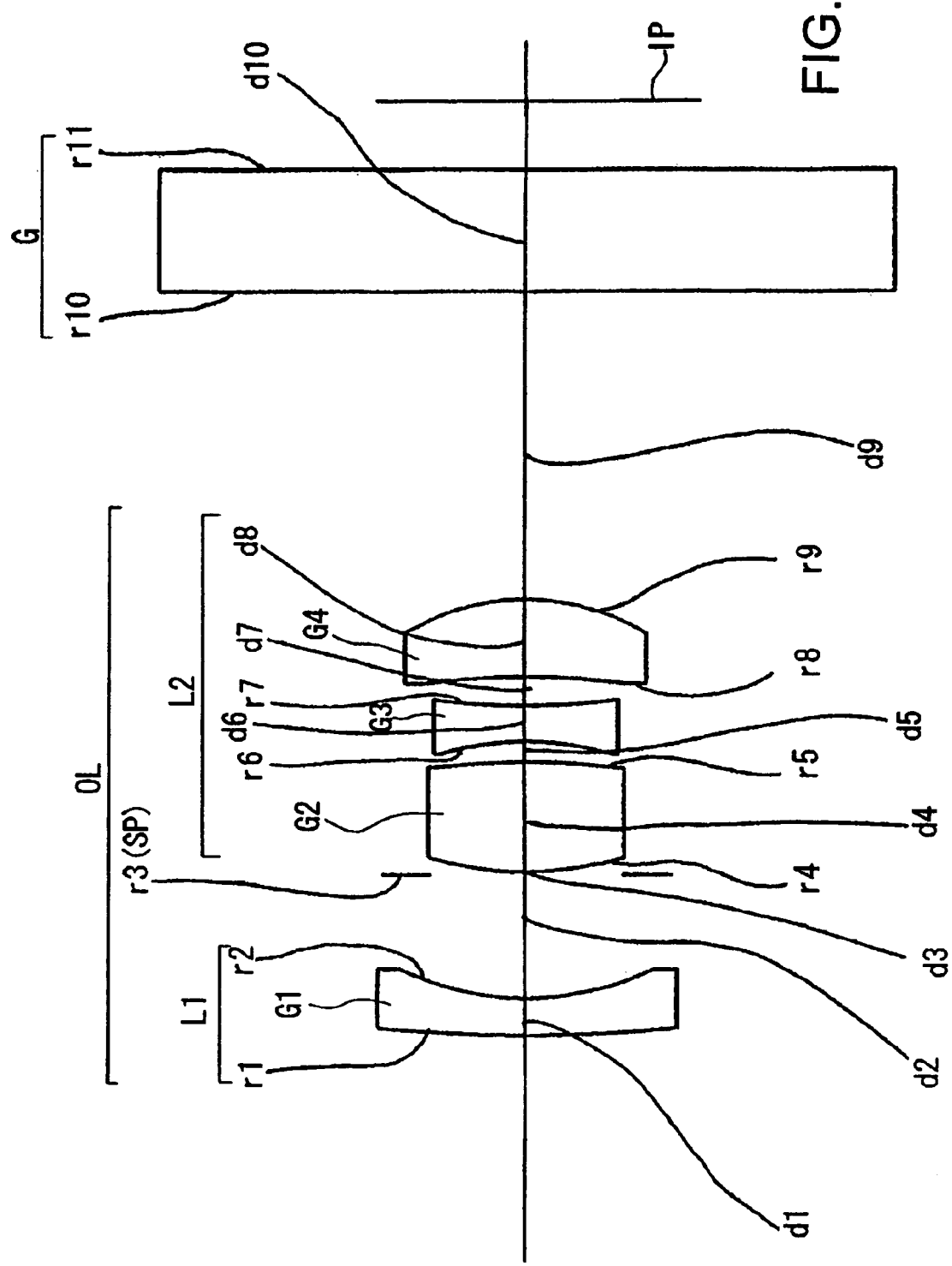
FIG. 11 is a lens section view of a lens system of Embodiment 6.
Figure 12:
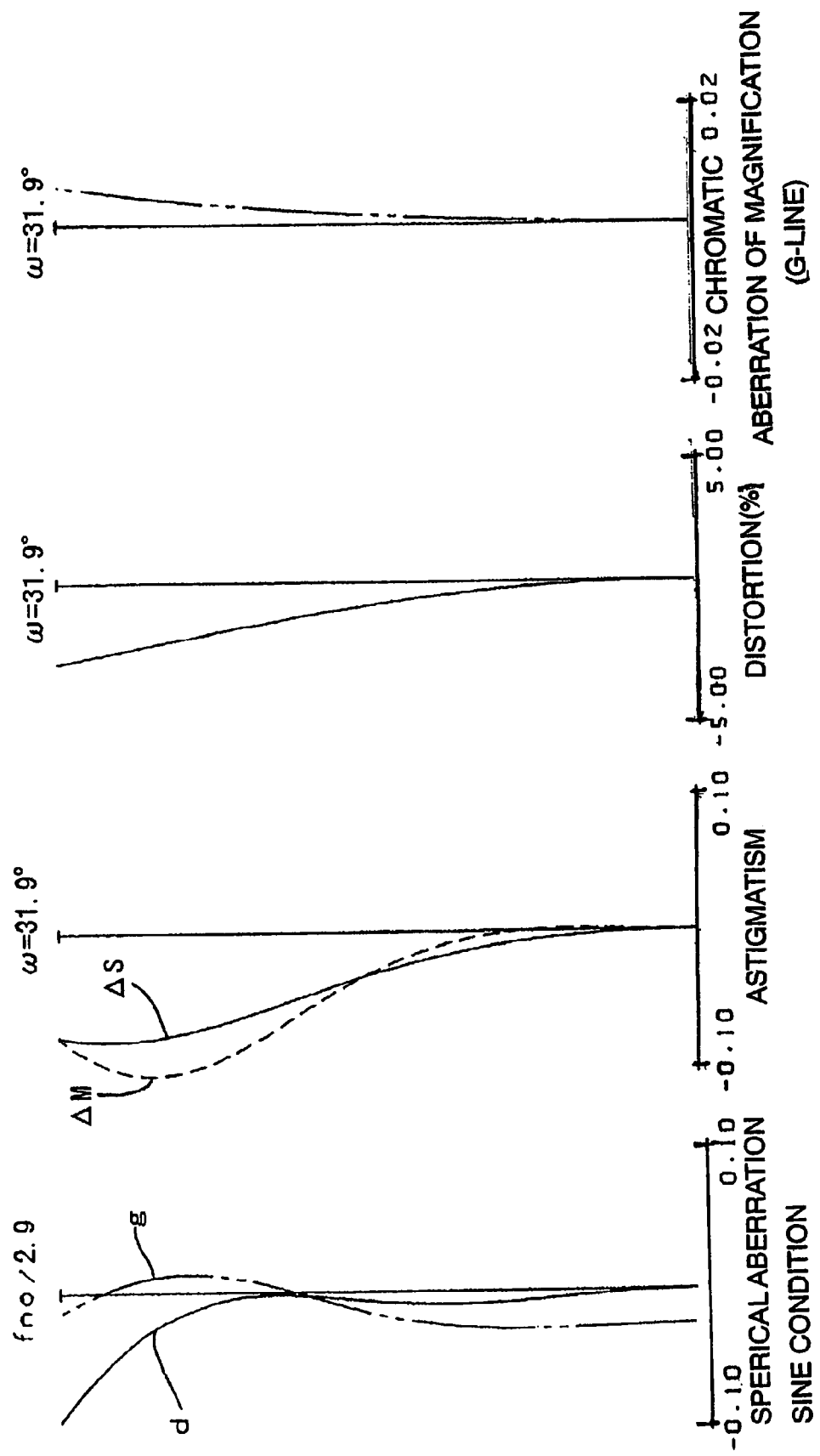
FIG. 12 is an aberration diagram of a lens system of Embodiment 6.
Figure 13:
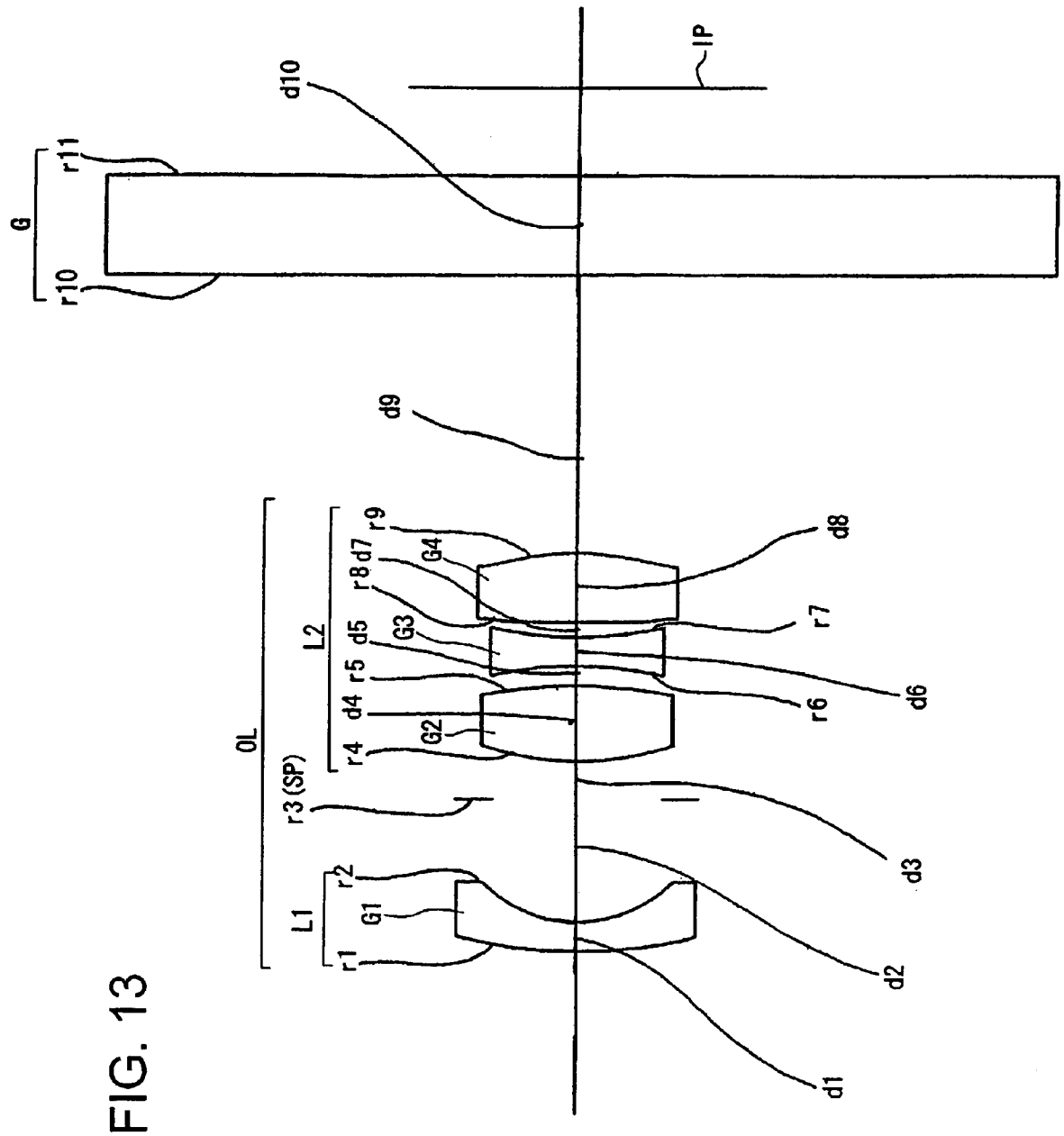
FIG. 13 is a lens section view of a lens system of Embodiment 7.
Figure 14:
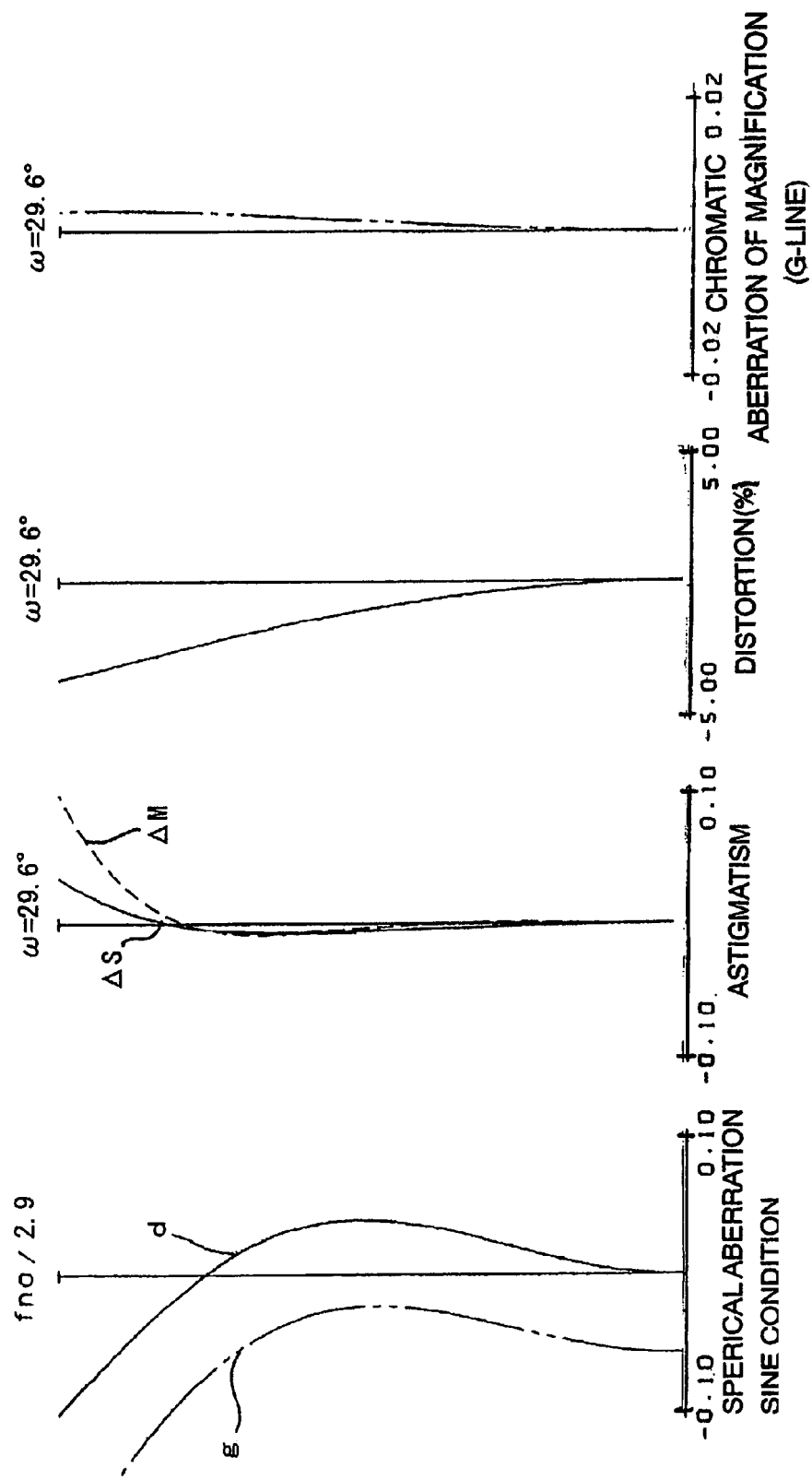
FIG. 14 is an aberration diagram of a lens system of Embodiment 7.
Figure 15:
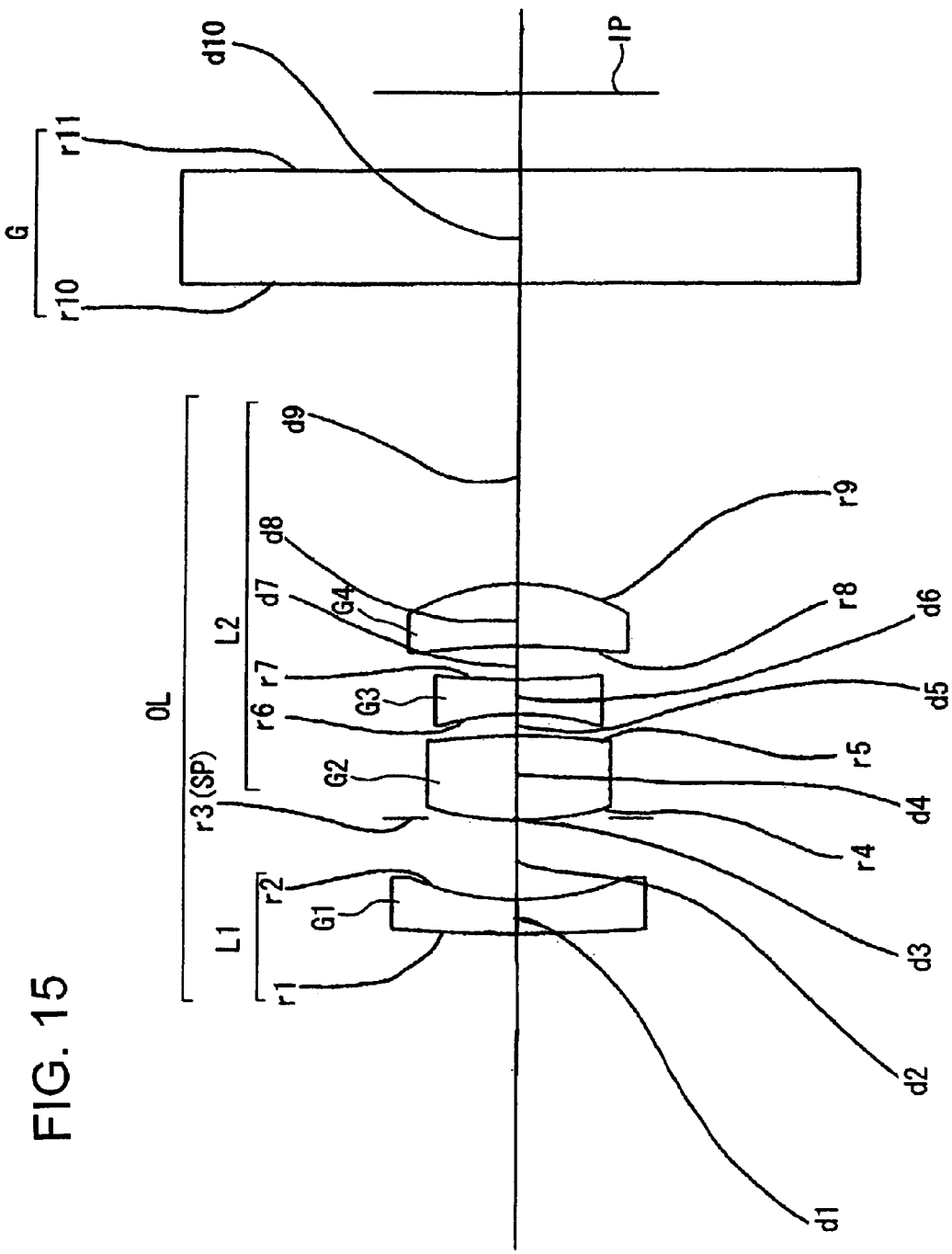
FIG. 15 is a lens section view of a lens system of Embodiment 8.
Figure 16:
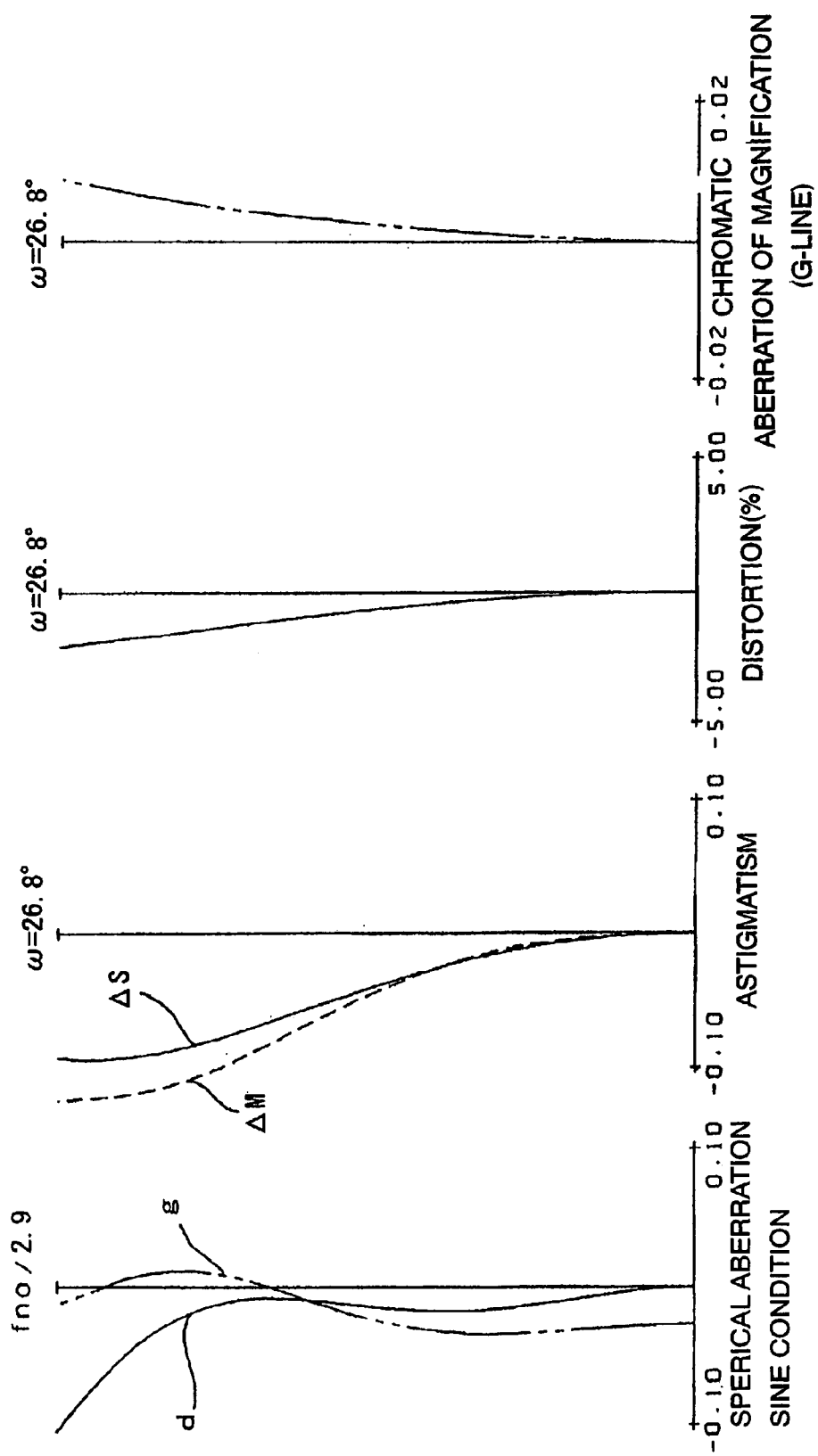
FIG. 16 is an aberration diagram of a lens system of Embodiment 8.

FIG. 1, FIG. 3, FIG. 5, FIG. 7, FIG. 9, FIG. 11, FIG. 13, and FIG. 15 are lens section views of image-taking lenses corresponding to Embodiments 1–8. FIG. 2, FIG. 4, FIG. 6, FIG. 8, FIG. 10, FIG. 12, FIG. 14, and FIG. 16 are various aberration diagrams of the image-taking lenses of Embodiments 1–8. In the lens section views, the left side is an image-taken object side (an object side, front) and the right side is an image plane side (rear).

In each lens section view, OL denotes an image-taking lens. The image-taking lens OL is constituted by a first lens unit (front lens component) L1 having a negative refractive power (optical power), an aperture stop SP, and a second lens unit (rear lens component) L2 having a positive refractive power, and has a retro focus-type lens structure. G denotes an optical block corresponding to an optical filter, face plate or the like. IP denotes an image plane, which corresponds to a position of an image pickup plane of a solid-state image pickup element (photoelectric conversion element) such as a CCD sensor, a CMOS sensor or the like.

In the respective aberration diagrams, d and g show d-line and g-line, $\Delta M$ and $\Delta S$ show a meridional image plane and a sagittal image plane, and $\omega$ shows a half-filed angle. Chromatic aberration of magnification is shown by the g-line.

Here, in the image-taking lenses OL of the present embodiments, the first lens unit L1 consists of a first lens G1 whose image-side surface has a concave shape, having a negative refractive power. The second lens unit L2 is constituted by a second lens G2 whose both lens surfaces have a convex shape, having a positive refractive power, a third lens G3 whose both lens surfaces have a concave shape, having a negative refractive power, and a fourth lens G4 whose object-side surface has a convex shape, having a positive refractive power. In the respective lenses G2–G4 of the second lens unit L2, intervals thereof are reduced as small as possible to realize compactness.

As such, the image-taking lenses OL of the present embodiments have satisfactory optical performance with a 4 units and 4 elements lens structure and thus achieve a small-sized simple structure.

In the present embodiments, in order to reduce the respective lens intervals of the second lens unit L2, a glass material whose refractive index is 2.0 or more is used for the second lens G2. If a reduction of the entire lens length of the second lens unit L2 is intended in a condition where the refractive index of the material of the second lens G2 is small, a refractive power to raise up an off-axis light ray in the interval between the second lens G2 and third lens G3 weakens and it becomes difficult to maintain satisfactory off-axis performance. On the other hand, if curvature of the lens surface is reduced to strengthen the refractive power of the second lens G2, the second lens G2 increases in thickness and consequently causes an increase in size. Accordingly, in the present embodiments, while the radius of curvature of the lens surfaces is increased, a glass material whose refractive index is 2.0 or more is used so as to increase the refractive power of the second lens G2. Accordingly, it becomes possible to narrow the lens intervals between the respective lenses of the second lens unit L2, thus high performance can be realized despite a compact lens structure.

In addition, in the present embodiments, an aperture stop SP is provided between the first lens unit L1 and second lens unit L2 so that the combination of maintaining telecentricity and downsizing can be realized. For example, in a case where the aperture stop SP is arranged at an object side beyond the first lens G1 to separate the exit pupil from the image plane as much as possible, it becomes difficult to maintain satisfactory optical performance, and since the aperture stop SP is positioned outside the entire lens system, this results in an increase in size in terms of an optical device including the lens barrel. In addition, if the aperture stop SP is arranged at an image side beyond the second lens G2, it becomes difficult to sufficiently separate the exit pupil from the image plane.

The first lens unit L1 consists of a meniscus-shaped single lens G1 whose concave surface is directed to the image side. In contrast thereto, in a case of a structure where the concave surface is directed toward an object side, although the entire lens length does not change, this results in an increase in size in terms of an optical device including the lens barrel. It is necessary to provide the first lens G1 with an effect to refract the off-axis principal ray to some degree to make the exit pupil position separate. Accordingly, although the first lens G1 requires a certain degree of negative refractive power, consequently, barrel-shaped distortion easily occurs at the first lens G1. Minimizing the incident angle of the off-axis principal ray is effective to hold this occurrence of distortion to a minimum. For example, if a concentric radius of curvature is provided, the off-axis incident angle can be made 0, however, this cannot provide the above-described "some degree" of negative refractive power. Accordingly, in the image-taking lens OL of each of the present embodiments, the first lens G1 is formed so that the object-side surface is provided with a large radius of curvature and the image side surface is provided with a small radius of curvature with respect to a concentric shape, so as to strengthen the refractive power, while the first lens G1 maintains a meniscus shape whose strong concave surface is directed toward the image side to hold occurrence of distortion to a minimum. And, this distortion is corrected by the second lens unit L2.

In addition, an aspherical surface is used in the fourth lens G4 of the rearmost lens to obtain satisfactory image-forming performance. If the fourth lens G4 is composed of a spherical lens, refractive power of the rearmost lens must be strengthened, whereby a barrel-type distortion and an undercurvature of field occur, thus it becomes difficult to obtain satisfactory image-forming performance. In order to improve image-forming performance by only spherical lenses, the number of lenses must be increased, and it becomes difficult to make the entire lens system compact. Therefore, in each embodiment, an aspherical surface is used in the fourth lens G4 to satisfactorily perform aberration correction.

In the image-taking lens OL of each of the present embodiments, where an entire lens length (a distance from the object-side lens surface of the first lens G1 to the image-side lens surface of the fourth lens G4) is provided as td, a focal length of the entire lens system is provided as f, a focal length of the first lens unit L1 (first lens G1) is provided as f1, and an interval from the object-side surface of the first lens unit L1 (first lens G1) to the object-side surface of the second lens unit L2 (second lens G2) is provided as d2, One or More of the Following Conditional Expressions are Satisfied:

$$0.7 < td/f < 1.3 \quad (1)$$

$$0.8 < |f1|/f < 2.5 \quad (2)$$

$$0.1 < d2/f < 0.8 \quad (3).$$

In addition, when applied to an image-taking apparatus (camera) to form an image within a predetermined effective image pickup plane of a solid-state image pickup element or the like by the image-taking lens of each embodiment, where an effective diameter of the most image-side surface of the second lens unit L2 (image side surface of the fourth lens G4) is provided as $\phi$, a half-field angle of the entire system of the image-taking lens OL is provided as $\omega$, a distance from the most image side surface of the image-taking lens OL to a position of the rear principal point of the image-taking lens OL is provided as ok, and an angle formed by the off-axis principal ray which are directed from the most image-side surface of the second lens unit L2 (image-side surface of the fourth lens G4) to the maximum image height on the effective image-pickup plane and an on-axis principal ray is provided as $\theta$, One or More of the Following Conditional Expressions are Satisfied:

$$0.19 < (\tan \omega - \phi/2f)/(1 - ok/f) < 0.37 \quad (4)$$

$$15° < \theta < 25° \quad (5).$$

Next, technical meanings of the above-described conditional expressions will be described.

Conditional Expression (1) is an expression to define the entire lens length. When the upper limit of the Conditional Expression (1) is exceeded, it is difficult to make the entire lens system compact, refractive power of the first lens G1 weakens, and consequently, refractive power of the fourth lens G4 strengthens, therefore, it becomes difficult to obtain satisfactory optical performance. In addition, when the entire lens length is reduced beyond the lower limit value, respective lens intervals are accordingly reduced, no interval to place a stop unit is secured and refractive power of the first lens G1 strengthens, therefore, it becomes difficult to obtain satisfactory optical performance.

Conditional Expression (2) is an expression to define the focal length of the first lens unit L1, namely, the refractive power. If the refractive power strengthens beyond the upper limit value of Conditional Expression (2), since it is necessary to strengthen the refractive power of the fourth lens G4, it becomes impossible to reduce the Petzval sum, and curvature of field greatly occurs, this is not preferable. In addition, if the refractive power strengthens beyond the lower limit value of Conditional Expression (2), distortion and astigmatism excessively occur at the first lens G1, and correction thereof is difficult even by use of an aspherical surface, thus this is not preferable.

Conditional Expression (3) is an expression to define the interval between the first lens G1 and second lens G2, namely, the entire lens length. If the interval between the first lens G1 and second lens G2 widens beyond the upper limit, the entire lens length cannot be shortened, refractive power of the first lens G1 weakens, and consequently, refractive power of the fourth lens G4 strengthens, therefore, it becomes difficult to obtain satisfactory optical performance. In addition, if the lens interval becomes small beyond the lower limit value, no interval to place a stop unit is secured and refractive power of the first lens G1 strengthens, therefore, it becomes difficult to obtain satisfactory optical performance.

Conditional Expression (4) is an expression to define the light amount of the entire effective image-pickup plane. If the light amount exceeds the upper limit of Conditional Expression (4), the outside diameter of the image-taking lens becomes large-sized as a result of an increase in the rear-lens diameter of the image-taking lens, this is not preferable. In addition, if the light amount is reduced beyond the lower limit of Conditional Expression (4), the light amount in the periphery of the image-pickup plane becomes small, causing a problem such as shading, therefore, this is not preferable.

Conditional Expression (5) is an expression to define an angle formed by an off-axis principal ray which are directed from the rearmost surface of the rearmost lens (fourth lens G4) toward the maximum image height and an on-axis principal ray. If the angle is increased beyond the upper limit of Conditional Expression (5), since a problem such as shading occurs, this is not preferable. In addition, if the angle is reduced beyond the lower limit of Conditional Expression (5), since refractive power of the fourth lens G4 must be strengthened, it becomes impossible to reduce the Petzval sum, and curvature of field greatly occurs, this is not preferable. In addition, in order to suppress the refractive power of the fourth lens G4, it is necessary to strengthen the negative refractive power of the first lens G1 or to lengthen the entire lens length, it becomes difficult to make the entire lens system compact.

Moreover, in each embodiment, when a refractive index of the material in the second lens unit L2 is provided as n, the second lens unit L2 has a lens which satisfies the following condition:

$$n > 2.0 \quad (6).$$

Conditional Expression (6) is an expression to define the refractive index of the lens material in the second lens unit L2. If the refractive index becomes small beyond the lower limit value of Conditional Expression (6), intervals between the respective lenses in the second lens unit L cannot be narrowed, and it becomes difficult to shorten the entire lens length.

Herein, as a method for, while satisfactorily performing aberration correction, further downsizing the entire lens system, it is preferable to set numerical value ranges of the above-described Conditional Expressions (1)–(6) as follows:

$$0.72 < td/f < 1.26 \quad (1a)$$

$$1.0 < |f1|/f < 2.4 \quad (2a)$$

$$0.15 < d2/f < 0.7 \quad (3a)$$

$$0.195 < (\tan \omega - \phi/2f)/(1 - ok/f) < 0.365 \quad (4a)$$

$$16° < \theta < 24.5° \quad (5a)$$

$$n > 2.001 \quad (6a).$$

As above, in each embodiment, a wide filed angle for image-taking is realized by employing a retro focus-type lens system, and by adjusting the exit pupil position, a compact image-taking lens whose number of lenses is small, filed angle for image-taking is approximately 55°, F-number is approximately 2.9 and which has high optical performance where various aberrations of the entire image-pickup plane have been satisfactorily corrected is achieved.

Next, Numerical Examples 1–8 corresponding to Embodiments 1–8 of the present invention, respectively, will be shown. In each numerical example, i shows an order of the optical surface from the object side, ri shows a radius of curvature of the i-th optical surface (i-th surface), di shows an interval between the i-th surface and i+1-th surface, ni and vi respectively show a refractive index and Abbe's number of the material for the i-th optical member with respect to the d-line.

In addition, k is provided as a conic coefficient, B, C, D, and E are provided as aspherical coefficients. Furthermore, when a displacement in the optical axis direction at a position of a height h from the optical axis is provided as x with reference to the surface apex, an aspherical shape is expressed by:

$$x = \frac{(1/R)h^2}{1 + \sqrt{\{1 - (1+K)(h/R)^2\}}} + Bh^4 + Ch^6 + Dh^8 + Eh^{10}$$

Herein, R denotes a radius of curvature. In addition, for example, a. "D-Z" expression means "$10^{-Z}$." In addition, correspondence of each numerical example to the above-described conditional expressions is shown in Table 1. f denotes a focal length, fno denotes an F-number, and ω is a half-filed angle.

In Numerical Examples, r10 and r11 mean surfaces of an optical block G.

Numerical Reference 1

| f = 7.00 fno = 1:2.9 2ω = 53.7° | | | |
|---|---|---|---|
| r1 = 30.031 | d1 = 0.50 | n1 = 1.48749 | v1 = 70.2 |
| r2 = 4.387 | d2 = 1.66 | | |
| r3 = APERTURE STOP | d3 = 0.64 | | |
| r4 = 5.499 | d4 = 2.05 | n2 = 2.00330 | v2 = 28.3 |
| r5 = −9.667 | d5 = 0.34 | | |
| r6 = −4.169 | d6 = 0.50 | n3 = 1.92286 | v3 = 18.9 |
| r7 = 13.486 | d7 = 0.25 | | |
| r8 = −17.552 | d8 = 1.57 | n4 = 1.80400 | v4 = 46.6 |
| r9 = −3.686 | d9 = 5.08 | | |
| r10 = ∞ | d10 = 1.65 | n5 = 1.54427 | v5 = 70.6 |
| r11 = ∞ | | | |

| | | ASPHERICAL COEFFECIENT | | | | |
|---|---|---|---|---|---|---|
| SURFACE NO. | CURVATURE | K | B | C | D | E |
| 9 | −1.75525D+01 | −2.61515D+02 | −4.62366D−03 | 1.67860D−03 | | |
| 10 | −3.68558D+00 | −8.40840D+00 | −1.81769D−02 | 3.77635D−03 | −5.58579D−04 | 5.59955D−05 |

Numerical Reference 2

| f = 6.55000 fno = 1:2.9 2ω = 56.9° | | | |
|---|---|---|---|
| r1 = 17.864 | d1 = 0.50 | n1 = 1.48749 | ν1 = 70.2 |
| r2 = 4.000 | d2 = 1.68 | | |
| r3 = APERTURE STOP | d3 = 0.75 | | |
| r4 = 5.072 | d4 = 1.67 | n2 = 2.00330 | ν2 = 28.3 |
| r5 = −10.728 | d5 = 0.39 | | |
| r6 = −4.555 | d6 = 0.50 | n3 = 1.92286 | ν3 = 18.9 |
| r7 = 7.708 | d7 = 0.38 | | |
| r8 = −73.830 | d8 = 1.77 | n4 = 1.76802 | ν4 = 49.2 |
| r9 = −3.593 | d9 = 4.58 | | |
| r10 = ∞ | d10 = 1.65 | n5 = 1.54427 | ν5 = 70.6 |
| r11 = ∞ | | | |

| | | ASPERICAL COEFFICIENT | | | | |
|---|---|---|---|---|---|---|
| SURFACE NO. | CURVATURE | K | B | C | D | E |
| 9 | −7.38299D+01 | −1.25317D+04 | −3.76540D−03 | 1.02542D−03 | | |
| 10 | −3.59333D+00 | −6.46259D+00 | −1.54129D−02 | 2.31105D−03 | −3.06474D−04 | 2.83489D−05 |

Numerical Reference 3

| f = 7.10 fno = 1:2.9 2ω = 53.3° | | | |
|---|---|---|---|
| r1 = 4.598 | d1 = 0.50 | n1 = 1.48749 | ν1 = 70.2 |
| r2 = 2.722 | d2 = 3.25 | | |
| r3 = APERTURE STOP | d3 = 0.64 | | |
| r4 = 5.393 | d4 = 1.80 | n2 = 2.00330 | ν2 = 28.3 |
| r5 = −8.840 | d5 = 8.35 | | |
| r6 = −5.803 | d6 = 0.50 | n3 = 1.92286 | ν3 = 18.9 |
| r7 = 6.289 | d7 = 0.26 | | |
| r8 = −13.293 | d8 = 1.20 | n4 = 1.78800 | ν4 = 47.4 |
| r9 = −3.752 | d9 = 4.74 | | |
| r10 = ∞ | d10 = 1.65 | n5 = 1.54427 | ν5 = 70.6 |
| r11 = ∞ | | | |

| | | ASPHERICAL COEFFICIENT | | | | |
|---|---|---|---|---|---|---|
| SURFACE NO. | CURVATURE | K | B | C | D | E |
| 9 | −1.32927D+01 | −1.97489D+02 | −1.01443D−02 | 2.12661D−03 | | |
| 10 | −3.75211D+00 | −8.16773D+00 | −1.78215D−02 | 3.05029D−03 | −3.53805D−04 | 3.73836D−05 |

Numerical Reference 4

| f = 6.00000 fno = 1:2.9 2ω = 61.2° | | | |
|---|---|---|---|
| r1 = 11.370 | d1 = 0.50 | n1 = 1.48749 | ν1 = 70.2 |
| r2 = 4.000 | d2 = 3.04 | | |
| r3 = APERTURE STOP | d3 = −0.10 | | |
| r4 = 3.787 | d4 = 1.25 | n2 = 2.00330 | ν2 = 28.3 |
| r5 = −12.832 | d5 = 0.20 | | |
| r6 = −4.923 | d6 = 0.50 | n3 = 1.92286 | ν3 = 18.9 |
| r7 = 5.856 | d7 = 0.20 | | |
| r8 = −8.372 | d8 = 1.11 | n4 = 1.77250 | ν4 = 46.6 |
| r9 = −3.094 | d9 = 3.48 | | |
| r10 = ∞ | d10 = 1.65 | n5 = 1.54427 | ν5 = 70.6 |
| r11 = ∞ | | | |

|  | | ASPHERICAL COEFFICIENT | | | |
|---|---|---|---|---|---|
| SURFACE NO. | CURVATURE | K | B | C | D | E |
| 9 | -8.37172D+00 | -1.19469D+02 | -2.60271D-02 | 9.54817D-03 | | |
| 10 | -3.00384D+00 | -5.84479D+00 | -2.87538D-02 | 6.67046D-03 | -6.94599D-04 | 1.91999D-04 |

Numerical Reference 5

| f = 6.10 fno = 1:2.9 2ω = 60.3° | | | |
|---|---|---|---|
| r1 = 11.370 | d1 = 0.50 | n1 = 1.48749 | ν1 = 70.2 |
| r2 = 4.000 | d2 = 3.04 | | |
| r3 = APERTURE STOP | d3 = -0.10 | | |
| r4 = 3.787 | d4 = 1.25 | n2 = 2.00330 | ν2 = 28.3 |
| r5 = -12.332 | d5 = 0.20 | | |
| r6 = -4.923 | d6 = 0.50 | n3 = 1.92286 | ν3 = 18.9 |
| r7 = 5.856 | d7 = 0.20 | | |
| r8 = -8.372 | d8 = 1.11 | n4 = 1.77250 | ν4 = 49.6 |
| r9 = -8.004 | d9 = 3.48 | | |
| r10 = ∞ | d10 = 1.65 | n5 = 1.54427 | ν5 = 70.6 |
| r11 = ∞ | | | |

|  | | ASPHERICAL COEFFICIENT | | | |
|---|---|---|---|---|---|
| SURFACE NO. | CURVATURE | K | B | C | D | E |
| 9 | -8.37172D+00 | -1.19469D+02 | -2.60271D-02 | 9.54817D-03 | | |
| 10 | -3.00384D+00 | -6.84479D+00 | -2.87586D-02 | 6.67046D-03 | -6.94599D-04 | 1.91999D-04 |

Numerical Example 6
Numerical Reference 6

| f = 6.60 fno = 1:2.9 2ω = 63.9° | | | |
|---|---|---|---|
| r1 = 21.462 | d1 = 0.50 | n1 = 1.48749 | ν1 = 70.2 |
| r2 = 4.000 | d2 = 1.70 | | |
| r3 = APERTURE STOP | d3 = 0.04 | | |
| r4 = 4.577 | d4 = 1.53 | n2 = 2.00330 | ν2 = 28.3 |
| r5 = -9.800 | d5 = 0.29 | | |
| r6 = -4.070 | d6 = 0.50 | n3 = 1.92286 | ν3 = 18.9 |
| r7 = 10.467 | d7 = 0.40 | | |
| r8 = -10.531 | d8 = 1.07 | n4 = 1.77250 | ν4 = 49.6 |
| r9 = -3.049 | d9 = 4.23 | | |
| r10 = ∞ | d10 = 1.66 | n5 = 1.54427 | ν5 = 70.6 |
| r11 = ∞ | | | |

|  | | ASPHERICAL COEFFICIENT | | | |
|---|---|---|---|---|---|
| SURFACE NO. | CURVATURE | K | B | C | D | E |
| 9 | -1.05309D+01 | -1.58116D+02 | -1.64652D-02 | 4.66597D-03 | | |
| 10 | -3.04916D+00 | -6.44016D+00 | -2.56730D-02 | 4.70902D-03 | -6.20952D-04 | 1.23686D-04 |

Numerical Example 7
Numerical Reference 7

| f = 6.2 fno = 1:2.9 2ω = 53.7 | | | |
|---|---|---|---|
| r1 = 8.305 | d1 = 0.50 | n1 = 1.48749 | ν1 = 70.2 |
| r2 = 2.349 | d2 = 2.11 | | |
| r3 = APERTURE STOP | d3 = 0.64 | | |
| r4 = 4.914 | d4 = 1.30 | n2 = 2.00330 | ν2 = 28.3 |
| r5 = −7.981 | d5 = 0.35 | | |
| r6 = −8.302 | d6 = 0.50 | n3 = 1.92286 | ν3 = 18.9 |
| r7 = 6.556 | d7 = 0.26 | | |
| r8 = −97.323 | d8 = 1.20 | n4 = 1.69680 | ν4 = 55.5 |
| r9 = −4.298 | d9 = 4.74 | | |
| r10 = ∞ | d10 = 1.65 | n5 = 1.54427 | ν5 = 70.6 |
| r11 = ∞ | | | |

| | | ASPHERICAL COEFFICIENT | | | |
|---|---|---|---|---|---|
| SURFACE NO. | CURVATURE | K | B | C | D | E |
| 9 | 9.73232D+01 | 1.77834D+03 | 2.87857D−03 | 2.22690D−03 | | |
| 10 | −4.29755D+00 | −9.30471D+00 | −3.66763D−03 | 3.65482D−03 | −2.00019D−04 | 8.49398D−05 |

Numerical Example 8
Numerical Reference 8

| f = 7.00 fno = 1:2.9 2ω = 53.7 | | | |
|---|---|---|---|
| r1 = 23.710 | d1 = 0.50 | n1 = 1.48749 | ν1 = 70.2 |
| r2 = 4.000 | d2 = 1.21 | | |
| r3 = APERTURE STOP | d3 = −0.04 | | |
| r4 = 4.533 | d4 = 1.26 | n2 = 2.00330 | ν2 = 28.3 |
| r5 = −9.985 | d5 = 0.34 | | |
| r6 = −3.930 | d6 = 0.50 | n3 = 1.92286 | ν3 = 18.9 |
| r7 = 12.213 | d7 = 0.50 | | |
| r8 = −10.286 | d8 = 0.92 | n4 = 1.77250 | ν4 = 49.6 |
| r9 = −3.040 | d9 = 4.44 | | |
| r10 = ∞ | d10 = 1.65 | n5 = 1.54427 | ν5 = 70.6 |
| r11 = ∞ | | | |

| | | ASPHERICAL COEFFICIENT | | | |
|---|---|---|---|---|---|
| SURFACE NO. | CURVATURE | K | B | C | D | E |
| 9 | −1.02856D+01 | −1.43606D+02 | −1.56457D−02 | 4.80940D−03 | | |
| 10 | −3.03998D+00 | −8.49558D+00 | −2.65802D−02 | 5.62788D−03 | −9.32248D−04 | 1.92313D−04 |

According to Embodiments 1–8, a lens system which maintains telecentricity and high optical performance despite a simple and small-sized lens structure can be achieved.

Next, an embodiment of a digital still camera (image-taking apparatus) with an image-taking lenses OL of Embodiments 1–8 will be described by use of FIG. 17.

FIG. 17(A) is a front view of a digital still camera, and FIG. 17(B) is a side sectional view. In the drawings, Reference Numeral 10 denotes a camera body (chassis), Reference Numeral 11 denotes an image-taking optical system using any image-taking lens of Embodiments 1–8, Reference Numeral 12 denotes a finder optical system, and Reference Numeral 13 denotes a solid-state image pickup element (photoelectric conversion element) such as a CCD sensor, a CMOS sensor or the like. The solid-state image pickup element 13 receives an object image formed by the image-taking optical system 11 and converts the object image to electrical information. Object image information obtained as the electrical information is storage in a storing portion (unillustrated).

By thus applying the image-taking lenses of Embodiments 1–8 to an image-taking optical system of a digital still camera, a compact image-taking apparatus (optical device) can be realized.

What is claimed is:

1. A lens system comprising: in order from the front to the rear,
   a first lens unit having a negative optical power, the first lens unit consisting of a lens element whose rear surface has a concave shape;
   an aperture stop; and

TABLE 1

| | NUMERICAL REFERENCE | | | | | | | |
|---|---|---|---|---|---|---|---|---|
| | 1 | 2 | 3 | 4 | 5 | 6 | 7 | 8 |
| CONDITIONAL EXPRESSION 1 | 1.09 | 1.16 | 1.13 | 1.117 | 1.24 | 0.91 | 1.11 | 0.74 |
| CONDITIONAL EXPRESSION 2 | 1.51 | 1.63 | 2.12 | 2.15 | 1.31 | 1.54 | 1.04 | 1.42 |
| CONDITIONAL EXPRESSION 3 | 0.33 | 0.37 | 0.55 | 0.49 | 0.57 | 0.26 | 0.44 | 0.17 |
| CONDITIONAL EXPRESSION 4 | 0.20 | 0.20 | 0.25 | 0.36 | 0.25 | 0.28 | 0.24 | 0.27 |
| CONDITIONAL EXPRESSION 5 | 16.5 | 16.1 | 19.3 | 24.2 | 19.4 | 20.5 | 19.0 | 20.4 |
| CONDITIONAL EXPRESSION 6 | 2.003 | 2.003 | 2.003 | 2.003 | 2.003 | 2.003 | 2.003 | 2.003 | a second lens unit having a positive optical power, the second lens unit comprising three lens elements,
wherein the following condition is satisfied:

$$0.7 < td/f < 1.3$$

where td denotes a length of the entire lens system, and f denotes a focal length of the entire lens system, wherein the second lens unit comprises a lens element which satisfies the following condition:

$$n > 2.0$$

where n denotes a refractive index of the material of the lens element.

2. The lens system according to claim 1, wherein the following conditions are satisfied:

$$0.8 < |f1|/f < 2.5$$

$$0.1 < d2/f < 0.8$$

where f1 denotes a focal length of the first lens unit, and d2 denotes an interval from a rearmost surface of the first lens unit to a foremost surface of the second lens unit.

3. The lens system according to claim 1, wherein the second lens unit has one or more aspherical surfaces.

4. The lens system according to claim 1, wherein the lens system forms an image on a photosensitive surface of a photoelectric conversion element.

5. An image-taking apparatus comprising:
a lens system according to claim 1 and
a photoelectric conversion element which receives light of an image formed by the lens system.

6. The image-taking apparatus according to claim 5, wherein the following condition is satisfied:

$$0.19 < (\tan \omega - \phi/2f)/(1 - ok/f) < 0.37$$

where $\omega$ denotes an effective diameter of a rearmost surface of the second lens unit, $\omega$ denotes a half-field angle of the entire lens system determined by an effective region of the photosensitive surface of the photoelectric conversion element, and ok denotes a distance from a rearmost surface of the entire lens system to a position of a rear principal point of the entire lens system.

7. The image-taking apparatus according to claim 5, wherein
the following condition is satisfied:

$$15° < \theta < 25°$$

where $\theta$ denotes an angle formed by an off-axis principal ray which are directed from a rearmost surface of the second lens unit to a maximum image height on a photosensitive surface of the photoelectric conversion element and an on-axis principal ray.

8. A lens system comprising: in order from the front to the rear,
a first lens element having a meniscus shape whose concave surface is directed rearward and having a negative optical power;
an aperture stop;
a second lens element whose both lens surfaces have a convex shape;
a third lens element whose both lens surfaces have a concave shape; and
a fourth lens element whose rear surface has a convex shape and having a positive optical power,
wherein lens elements included in the lens system are only the first to fourth lens elements, wherein the following condition is satisfied:

$$na > 2.0$$

where na denotes a refractive index of a material of the second lens element.

9. The lens system according to claim 8, wherein the following conditions are satisfied:

$$0.8 < |f1a|/fa < 2.5$$

$$0.1 < d2a/fa < 0.8$$

where f1a denotes a focal length of the first lens element, fa denotes a focal length of the entire lens system, and d2a denotes an interval from a rear surface of the first lens element to a front surface of the second lens element.

10. The lens system according to claim 8,
wherein the fourth lens element has one or more aspherical surfaces.

11. The lens system according to claim 8,
wherein the lens system forms an image on a photosensitive surface of a photoelectric conversion element.

12. An image-taking apparatus comprising:
a lens system according to claim 8 and
a photoelectric conversion element which receives light of an image formed by the lens system.

13. The image-taking according to claim 12,
wherein the following condition is satisfied:

$$0.19 < (\tan \omega a - \phi a/2f)/(1 - oka/f) < 0.37$$

where $\phi a$ denotes an effective diameter of a rear surface of the fourth lens element, $\omega a$ denotes a half-field angle of the entire lens system determined by an effective region of a photosensitive surface of the photoelectric conversion element, and oka denotes a distance from a rearmost surface of the entire lens system to a position of a rear principal point of the entire lens system.

14. The image-taking apparatus according to claim 12, wherein
the following condition is satisfied:

$$15° < \theta a < 25°$$

where $\theta a$ denotes an angle formed by an off-axis principal ray which are directed from a rear surface of the fourth lens element to a maximum image height on a photosensitive surface of the photoelectric conversion element and an on-axis principal ray.

15. An image-taking apparatus comprising:
a lens system comprising:
a first lens unit having a negative optical power, the first lens unit consisting of a lens element whose rear surface has a concave shape;
an aperture stop;
a second lens unit having a positive optical power, the second lens unit comprising three lens elements; and
a photoelectric conversion element which receives light of an image formed by the lens system,
wherein the following condition is satisfied:

$$0.19 < (\tan \omega - \phi/2f)/(1 - ok/f) < 0.37$$

where $\phi$ denotes an effective diameter of a rearmost surface of the second lens unit, $\omega$ denotes a half-field angle of the entire lens system determined by an effective region of a photosensitive surface of the photoelectric conversion element, and ok denotes a distance from a rearmost surface of the entire lens system to a position of a rear principal point of the entire lens system.

* * * * *